United States Patent Office 3,522,705
Patented Aug. 4, 1970

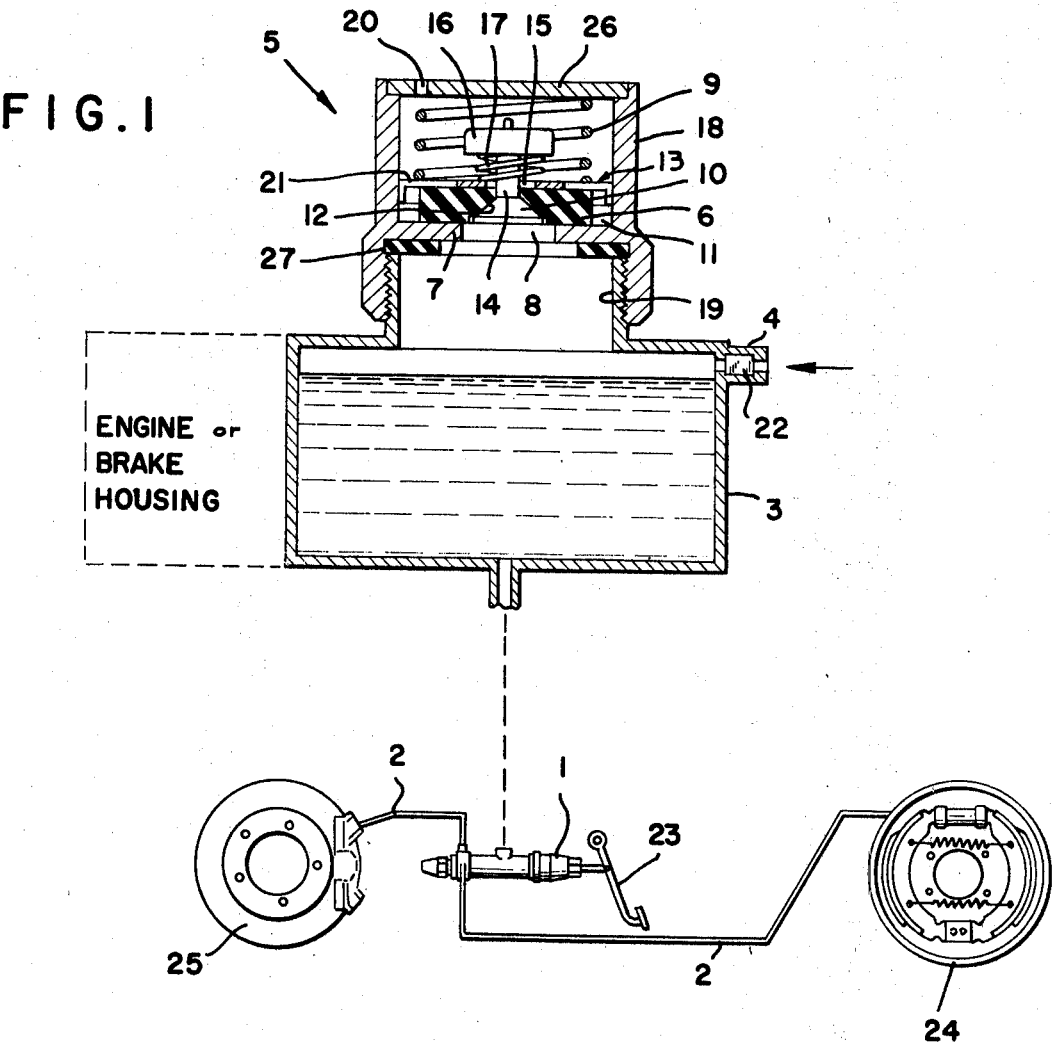
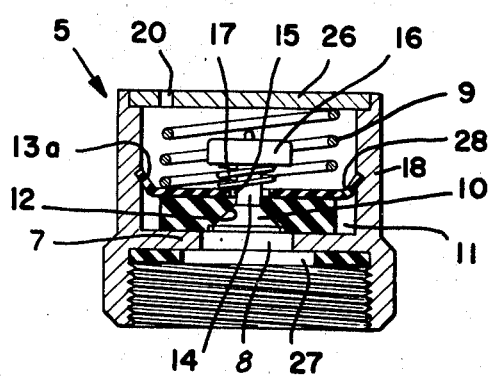

3,522,705
HYDRAULIC BRAKE SYSTEM
Franz Wienecke, Frankfurt am Main, Germany, assignor to Alfred Teves G.m.b.H., Frankfurt am Main, Germany, a corporation of Germany
Filed July 15, 1968, Ser. No. 744,815
Claims priority, application Germany, July 24, 1967,
T 34,394
Int. Cl. B60t *11/26;* F15b *1/06, 7/00, 7/08*
U.S. Cl. 60—54.6                    4 Claims

ABSTRACT OF THE DISCLOSURE

A hydraulic brake system has a brake-fluid reservoir wherein a gas pressure pocket behind the fluid is maintained at an elevated level to pressurize brake fluid in the system in order to hold the brakeshoes in slight contact with the wheel-brake drums or disks.

---

My invention relates to a hydraulic brake system wherein the brakeshoes are maintained in constant slight contact with the brake drums or disks.

It is a practice, in passenger-carrying automotive vehicles, to hold the brakeshoes in slight contact with the rotating drums or disks of the wheel brakes in order to make the brakes less sensitive to moisture, to keep the brakes slightly warm at all times for uniform operational characteristics, and to minimize pedal travel before brake actuation.

This has been done heretofore by providing the pistons of the wheel brakes with springs which bias the shoes against the drums and/or disks. Such a method of biasing the shoes has several distinct disadvantages. First of all, it requires additional expensive structure in each wheel cylinder. Also, it is virtually impossible to have identical tolerances in all the springs so that dfferent degrees of biasing and wear will be manifested at each brakeshoe used. In general, the prior-art method works irregularly.

It is an object of my invention to provide improved means for maintaining all brakeshoes in slight contact with their respective disks and/or drums without the use of separate biasing means at each wheel cylinder.

It is a further object of my invention to provide extremely simple, easily manufactured and trouble-free means for biasing the brakeshoes.

These objects are attained by controlledly pressurizing the air or another gas pocket or cushion in the brake-fluid reservoir so that the brake fluid in the entire system is pressurized to an equal extent by pneumatic pressure.

The air in the brake-fluid reservoir may be pressurized, according to this invention, by simply injecting pressurized air into the reservoir, which is airtight, and/or by heating the reservoir and/or master cylinder to generate gas pressure in the airtight reservoir as the heated gas expands. The heat for this latter method can be obtained from the engine or the brake structures themselves by mounting the reservoir and/or master cylinder thereon or otherwise placing the gas pocket in heat-exchanging relationship with the engine or brake housings.

According to a further feature of the invention, the reservoir is provided with a two-way pressure-relief or check valve. This valve vents the reservoir when air pressure therein surpasses a certain predetermined superatmospheric limit, and permits air to enter the reservoir when air pressure therein drops below atmospheric or a predetermined subatmospheric limit. As long as the air pressure in the reservoir remains between these limits, the reservoir is effectively airtight. This is important in that the brakeshoes are prevented from being pressed excessively against the disk, while a normal drop in brake fluid level will not deplete the gas head and render the device completely inoperative.

These and other objects, features and advantages of my invention, which will become apparent hereinafter, are described below with reference to the drawing in which:

FIG. 1 diagrammatically represents a brake system, according to my invention, with an expanded, sectional view of the reservoir and its valve; and FIG. 2 shows a detail of a second embodiment of my invention.

FIG. 1 of the drawing shows a brake system according to my invention wherein a master cylinder 1 communicates, via brake-fluid-transmission conduits or lines 2, with a front disk-type brake 25 and a rear drum-type brake 24.

Brake fluid is fed to the cylinder 1 from a brake-fluid reservoir mounted on an engine or brake housing represented by dot-dash lines and serving as heating means for generating gas pressure in the reservoir. Actuation of a pedal 23 causes a corresponding actuation of the brakes 24 and 25 and a slight drop in the fluid level in the reservoir 3.

The reservoir 3 is provided with a valve assembly 5 mounted in a cylindrical housing 18 having a press-fitted top 26 and a bottom wall 7. The assembly 5 threadedly engages the neck 19 of the reservoir 3; a gasket 27 is disposed between the neck and the cover 18 to seal them hermetically.

A rubber washer 6, held in place atop an aperture 8 in the wall 7 by a compression spring 9 and a spider having legs 21 (FIG. 1) or a membrane 13a formed with perforation 28 (FIG. 2) and fixed in the housing 18, serves as the outgoing pressure-regulating check valve.

A rod 14, formed with a cone-shaped end 10 fitting a valve seat 12 in a bore 11 through the washer 6, passes through a hole 15 in the spider 13 or the membrane 13a and is provided with an abutment cap 16 which is urged by the spring 17 upwardly. This serves as a second or incoming check valve.

The brake system, according to my invention, is operated as follows:

To originally pressurize the air in the reservoir 3, one or both of two methods may be employed. Pressurized air may simply be injected therein thorugh a check valve 22 at a nipple 4 in the side wall of the reservoir 3. It may also be injected into the vent 20, in which case pressure-induced downward disengagement of the end 10 from the seat 12 allows air to enter the reservoir. Furthermore, due to the mounting of the reservoir 3 on the engine or brake housing, once this housing heats up on starting of the car or use of the brakes, the air and fluid in the reservoir 3 will expand, thereby becoming pressurized.

If too much pressure is developed in the reservoir 3 or is created therein by heat, air will force the washer 6 up against the spring 9 and will bleed past the washer and, in the case of the membrane 13a (FIG. 2), through a perforation 28 therein and thence through air vent 20 in the top 26.

Should too little pressure be present in the reservoir 3, air will automatically be sucked into the reservoir 3 on cooling of the engine or brakes, or actuation of the brakes when the engine is cool and will cause the fluid level to drop in the reservoir 3 enough to suck air in by pulling the cone-shaped end 10 out of engagement with its seat 12 thereby letting air enter.

Once a pressurized condition is established in the reservoir 3 by the means described above, a small force is transmitted to all the wheel cylinders by the brake fluid. This force pushes every shoe lightly against the corresponding disk and/or drum, thus bringing about the advantages of small brake-pedal travel, nonsensitivity to moisture, and constantly warm brakes through the use of a small device mounted in the reservoir cap. It is obvious from a hydraulic point of view that this force will be the same in the whole system so that one shoe will not be biased against its respective disk or drum more or less than another. In addition, the mounting of the valve assembly 5 in the reservoir cap makes for extremely simple installation, repair, and servicing of the brake system.

I claim:
1. A hydraulic brake system for a vehicle, said system comprising:
   a fluid-operated wheel brake;
   a master cylinder in fluid communication with said wheel brake;
   a brake-fluid reservoir containing brake fluid in fluid communication with said master cylinder, said reservoir defining a gas pocket pressurizing said brake fluid in said cylinder and in said wheel brake;
   pressure-control means for maintaining the gas pressure of said pocket above atmospheric pressure but below a predetermined superatmospheric level, said pressure-control means comprising a pressure-regulating check valve connected with said pocket and actuatable to vent said pocket upon said gas pressure exceeding said level, said reservoir having a wall defining said pocket and formed with an aperture surrounded by a valve seat, said valve further comprising a valve body and a spring biasing said valve body into sealing engagement with said seat against said gas pressure in said pocket;
   a second check valve so constructed and arranged as to admit air into said pocket upon said pressure falling below a predetermined subatmospheric level, the firstmentioned check valve and said second check valve being mounted in common housing, said wall being formed with a filler opening; and
   a filler-opening cap removably and sealingly covering said opening and forming said housing.

2. The system defined in claim 1 further comprising heating means for heating said reservoir for pressurizing said gas pocket.

3. The system defined in claim 2 wherein said heating means is a vehicle engine.

4. The system defined in claim 2 wherein said heating means is said wheel brake.

References Cited

UNITED STATES PATENTS

| 2,003,247 | 5/1935 | Carroll | 60—54.6 |
| 2,095,752 | 10/1937 | Labrie | 60—54.6 |
| 2,144,012 | 1/1939 | Dodge et al. | 60—54.6 |
| 2,197,126 | 4/1940 | Dick | 60—54.6 XR |

FOREIGN PATENTS

| 857,113 | 4/1940 | France. |
| 995,099 | 8/1951 | France. |

MARTIN P. SCHWADRON, Primary Examiner

R. BUNEVICH, Assistant Examiner

U.S. Cl. X.R.
188—152; 137—933.4